June 23, 1953

K. J. GREGG ET AL 2,643,127

RECORD PLAYER AND CHANGER

Filed May 27, 1949

INVENTORS
Kenneth J. Gregg and
BY Raymond Schulze
Bean, Brooks, Buckley & Bean.
ATTORNEYS Patented June 23, 1953

2,643,127

UNITED STATES PATENT OFFICE 2,643,127

RECORD PLAYER AND CHANGER

Kenneth J. Gregg and Raymond Schulze, Buffalo, N. Y.

Application May 27, 1949, Serial No. 95,796

7 Claims. (Cl. 274—10)

This invention relates to automatic phonographs, and more specifically to multiple record playing phonographs and to improved record magazine and automatic record holding and changing means therefor.

Whereas, various record magazine and automatic record change mechanisms have been previously devised, such prior arrangements have been deficient from the standpoint of complication of the mechanism and of limitation of the number of records that may be handled. Also, in the case of many of the prior arrangements the records are successively stacked upon a turntable for playing of the top record thereon, and the requisite record driving friction is usually lost when a relatively small number of records are on the turntable. Thus, the number of records that may be automatically handled is definitely limited in such arrangements.

Therefore, an object of the present invention is to provide an improved record magazine and changing and holding mechanism which is relatively simple and inexpensive to manufacture compared to prior devices, and yet which may provide a limitless record magazine capacity for programmed automatic record playing.

Another object of the invention is to provide in a mechanism of the character aforesaid an improved means for holding records successively at a playing position; and furthermore to enable such records to be played successively at the opposite sides thereof, if desired.

Another object is to provide an improved mechanism whereby extremely long musical record programs may be automatically played without operator attention as may be particularly useful for example in coin-operated phonographs employed for amusement purposes in commercial establishments, and in the home, and the like.

Other objects and advantages of the invention will appear in the specification hereinafter.

Figures 1, 2, 3, 4, 5, 6:
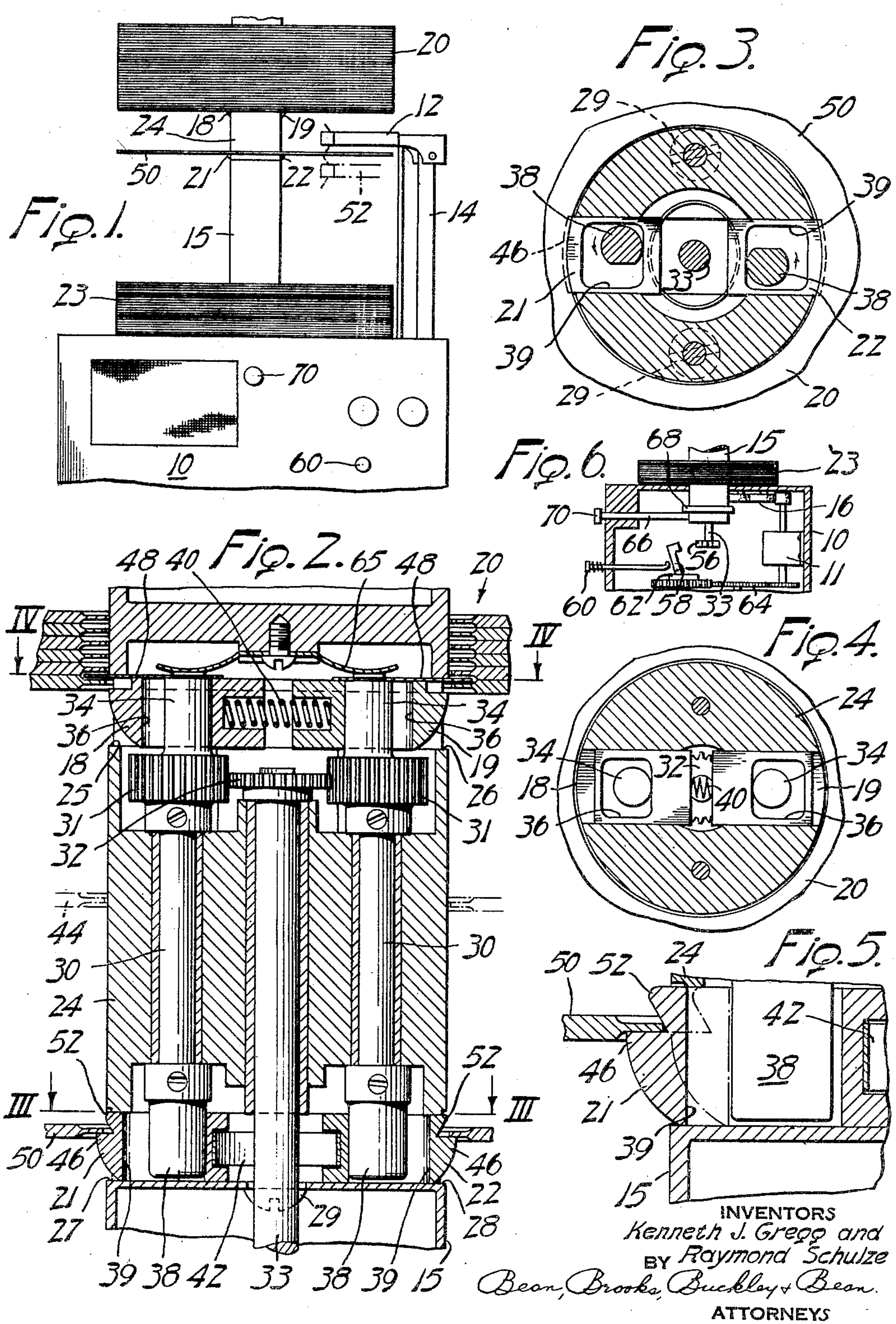
Fig. 1 is a fragmentary view in side elevation of a record magazine and changing and holding mechanism for successively holding program records at a playing station in accord with the invention.
Fig. 2 is a fragmentary vertical section, on an enlarged scale, through a portion of the record magazine and changing and holding control mechanism thereof.
Fig. 3 is a fragmentary section, on a reduced scale, taken along line III—III of Fig. 2.
Fig. 4 is a section on a reluced scale taken along line IV—IV of Fig. 2.
Fig. 5 is a fragmentary enlarged view of a detail of the construction of Fig. 2.
Fig. 6 is a schematic view of portions of the record handling control mechanism.

In the drawing, the invention is illustrated as being embodied in a record player comprising a cabinet 10 which houses the usual driving motor 11 (Fig. 6) and tone amplifying and broadcasting mechanisms (not shown). The tone arm of the mechanism is indicated at 12 as being mounted upon a vertically elongate shaft 14, the function of which will be referred to in greater detail hereinafter. The cabinet 10 mounts a record carrying spindle 15 which extends vertically from the cabinet and is rotatably mounted thereon by any suitable bearing means and is arranged to be driven by the motor 11 as by a speed reducing friction wheel train 16 or any other suitable gear device or the like as is well known in the art.

The spindle 15 in the mechanism of the present invention may resemble the record carrying spindle of the record players which are currently being marketed by the R. C. A. Victor Division, Radio Corporation of America for use in conjunction with their "new R. C. A. Victor record playing system," because in both cases the spindles of the record playing machines are preferably of relatively large size, of the order of 1½ inch diameter, as compared to the spindles of other presently conventional record playing turntables such as are of the order of ¼" diameter. Thus, the machine of the present invention is particularly adapted to operate with the new style Victor records having approximately 1½ inch center holes.

As in the case of the new Victor record player referred to, the spindle 15 of the machine of the present invention carries preferably therewithin a record change control mechanism which includes diametrically paired fingers 18—19 which are arranged to move between extended-retracted positions radially of the spindle 15, and means for actuating the fingers alternately between extended and retracted positions in a manner as will be explained more fully hereinafter. The fingers 18—19 are arranged to support thereabove when in extended position a vertical stack of records as indicated at 20 (Fig. 1) such as may be readily loaded upon the upper end of the spindle for subsequent playing in any desired preselected order. However, upon controlled retraction of the fingers 18—19 and operation of the associated mechanism they permit the record at the bottom position in the record magazine to drop away therefrom and to fall into engagement with a record holding arrangement comprising diametrically paired ledge members 21—22 which are arranged to move radially of the spindle axis between extended and retracted positions relative to the outer wall of the spindle. Thus, the ledges 21—22 are arranged to alternately engage and hold a record dropped from the magazine in position for playing by the pick up arm 12 as will be explained more fully hereinafter, and then to retract and release the played record so that it may fall down further on the spindle as to the played record storage space indicated at 23.

To house the finger devices 18—19 and the ledge devices 21—22 as well as the actuating mechanisms therefor, the spindle structure is generally of tubular form and may be fabricated to include a control housing portion 24 which as shown in Fig. 2 is radially recessed as indicated at 25—26 and at 27—28 to receive the finger and ledge pieces respectively in slide fitting relation therein. Screws 29 may be employed to assemble the housing 24 to the spindle 15. Also, the housing portion 24 is vertically bored and fitted therein with a pair of actuating shafts 30—30 carrying corresponding spur gears 31—31 which are arranged to mesh with a central gear 32. The gear 32 is in turn keyed to a central control shaft 33 which extends in rotatable relation through a vertical central bored portion of the housing 24.

At their upper ends the shafts 30—30 are formed with upstanding eccentric cam portions 34—34 which protrude into openings 36—36 formed in the finger members 18—19; and at their lower ends the shafts 30—30 are fitted with downwardly projecting eccentric cam portions 38—38 which protrude into openings 39—39 formed in the ledge members 21—22. A compression spring 40 is arranged between the upper finger members 18—19 so as to bias the latter toward outwardly projecting positions relative to the spindle housing, and a bent leaf spring 42 is similarly arranged between the ledge members 21—22 for biasing the latter toward projected positions relative to the spindle housing.

The cam devices of the shafts 30—30 are so arranged as to swing about inside of the openings within the finger and ledge members so as to force the latter to retract within the spindle housing against the forces of the corresponding spring devices during each revolution of the shafts 30—30. Thus, relative movement between the shaft 33 and the housing 24 will result in rotation of the shafts 30—30 within the housing so as to procure alternate retraction-extension movements of the finger and ledge devices.

Consequently, when the fingers 18—19 are in retracted positions as shown in Fig. 2 the lowermost record of the stack 20 is thereby freed so as to be permitted to fall in response to the forces of gravity past the fingers 18—19 and alongside the housing portion 24, as indicated at 44 for example, and thence downwardly into resting engagement upon the outermost extending lip portions 46 (Fig. 5) of the ledge members 21—22. In order to prevent more than one record from dropping at one time from the stack 20, the upper ends of the cam elements 34—34 are fitted with laterally extending fins 48 which are arranged to extend laterally from the cam members so as to underlie the next to the bottom record on the stack 20 when the finger members are retracted as to the position thereof shown in Fig. 2.

Particular attention is called to the fact that the cam portions 38—38 are arranged upon the shafts 30—30 in angularly offset relation compared to the cam portions 34—34, as may be readily seen by comparison of the sectional views Figs. 3-4; whereby it will be understood that during each cycle of record changing operation the ledge members 21—22 are the first to retract within the housing 24 so as to thereby free the previously held record therefrom, whereupon the ledge members 21—22 then commence to move outwardly again so as to reach a half-way extended position as illustrated by Fig. 2 at about the same time that the finger members 18—19 have been pulled into their fully retracted positions. Consequently, when a fresh record is dropped from the magazine 20 the ledge members 21—22 are in position to receive the same; and then as the actuating cycle is completed the ledge members continue to move outwardly as to the position thereof shown in Fig. 5, at which time the record to be played is in the position indicated at 50 (Figs. 1, 2 and 5) and is snugly gripped at the central bored portion thereof by means of obliquely overhanging grip portions 52 formed integrally with the ledge members 21—22.

Thus, as the ledge members 21—22 move out into their fully extended positions they firmly grip the record at the position 50 in such manner as to positively hold it against either tilting or vertical displacements relative to the spindle while at the same time providing ample frictional engagement between the record and the ledge members of the spindle, whereby the record is positively driven to rotate as a unit with the spindle. As illustrated in Fig. 1, the ledge members 21—22 are so positioned relative to the spindle unit as to receive and hold each record as it is to be played at the position thereof designated 50 which is in registry with the playing position of the tone arm 12. Thus, it will be appreciated that the tone arm 12 will at all times play upon records at the same elevation, and that therefore the tone arm need not be arranged so as to "climb" over a vertically increasing stack of records in order to play upon the topmost record thereof as in the case of conventional record playing equipment.

Also, it will be appreciated that the arrangement of the present invention lends itself particularly to an arrangement for successively playing each record at the opposite sides thereof, by employing means for vertically shifting the tone arm 12 so that when it swings into playing position it moves inwardly alternately at levels above and below the position of the record 50, for example as shown by the solid line and broken line illustration thereof as indicated at 52 (Fig. 1). Inasmuch as it is old in the art to arrange a tone arm so as to swing into playing position alternately above and below a single record and inasmuch as no claim thereto is made in this application it is believed unnecessary to illustrate and describe in further detail an apparatus such as will provide such control of the tone arm.

Thus, it will be appreciated that the spindle 15 may be so vertically dimensioned as to accommodate at the magazine portion 20 thereof any desired number of records in stacked relation with a played record reservoir space of corresponding dimension; in any case the record playing station 50 being disposed at a position vertically intermediate of the record magazine and played record reservoir spaces so that the tone arm operates always at only one elevation as explained hereinabove. Consequently, a preselected program of any desired records without practical limit of the number thereof may be arranged on the record magazine portion of the spindle 15 so that for example commercial establishments and the like may be furnished with constantly playing musical programs throughout long periods of time without operator-attention to the equipment. Or, as explained hereinabove the record changing and playing mechanism may be coin-controlled as in public places, and in such case a practically unlimited supply of records may be stacked upon the magazine section of the spindle 15 to good advantage.

Also, it will be understood of course that the record changing mechanism may be either automatically or manually controlled as is well known in the art; and that in either case the record changing operation may be effected as in the case of the mechanism of the drawing in the present application by operation of any suitable means for causing relative movement between the operating rod 33 and the spindle housing 24. For example, as illustrated in Fig. 6 the lower end of the rod 33 may be fitted with a gear or star wheel 56 which is adapted to be periodically engaged by a lever 58 which is adapted to be pivoted in response to pressure thereon from a manually operable push rod 60 which is spring biased outwardly; the lever 58 being thereupon thrust into a cam track portion of a rotating cam wheel 62 which is geared as indicated at 64 to the motor 11. The cam track portion of the member 62 is so arranged that whenever the lever 58 is pushed thereinto, the lever will be thereby drawn over so as to engage the star wheel 56 and to block the latter against rotation; the lever 58 remaining in its blocking position for a period of time corresponding to one revolution of the spindle 15. A leaf spring as indicated at 65 (Fig. 2) may be provided to brake the rotation of the shafts 30—30 so as to prevent overrunning thereof after the star wheel is released, and to maintain the elements in assembled relation.

Thus, it will be understood that for manual operation of the record changing mechanism, the push rod 60 need only be pressed upon so as to cause the lever 58 to engage within the cam track and to become thereby drawn into blocking engagement with the star wheel 56. The rod 33 is thereupon held against rotation while the spindle 15 continues to revolve; this relative motion between the spindle 15 and the rod 33 causing the gear devices 31—32 to actuate the shafts 30—30 within the spindle housing 24 so as to first retract the ledge members 21—22 so as to drop the record last being played, and then to cause the ledge members to commence to project again outwardly of the spindle while at the same time the finger devices 18—19 are withdrawn into the spindle so as to permit the lowermost record from the magazine stack 20 to slip down and to land upon the ledge portions 46—46. During this portion of the operation the plates 48—48 retain the remainder of the stack of records 20 in elevated position until such time as the fingers 18—19 return again to extended position, whereupon the entire stack of records 20 is permitted to drop downwardly on the spindle a distance equal to the thickness of one of the records, whereupon the magazine stack is in readiness for another record changing operation. In the meantime the ledge members 21—22 have continued to move outwardly so as to snugly grip the newly selected record within the recessed portions between the shoulders 46—52 of the ledge members, whereupon the newly selected record will be firmly geared to the spindle 15 and will commence to rotate therewith.

Throughout the record changing operation, the tone arm will of course be caused to swing in and out so as to permit the magazine records to drop successively onto the playing station, in the manner well known in the art and in response to operation of any suitable mechanism such as may be supplied for that purpose and such as is not shown in the present specification in the interests of simplification thereof. Also, it will be appreciated that in lieu of the manual operation of the record changing mechanism as in response to pressure applications against the push rod 60, the record changing operation may be automatically controlled by mechanisms such as are well known in the art; and that such other changing mechanisms are not illustrated and described in detail in this specification in the interests of simplification thereof; there being no claim by the applicants herein to such tone arm swinging and automatic record changing mechanism.

The mechanism of the present invention also lends itself with particular facility to a novel record magazine loading and unloading operation. For example, as illustrated in Fig. 6 the spindle 15 may be arranged to be normally supported vertically by means of any suitable lever device 66 which engages under a shoulder portion 68 of the spindle; the lever 66 being extended through a side wall opening of the cabinet structure and terminating in a knob portion 70 whereby outward pull upon the knob 70 will withdraw the lever 66 from the spindle ledge device so as to permit the spindle to lower into the cabinet. Thus, the spindle will slip downwardly through the stack of records such as may have previously accumulated at the played record reservoir portion 23, or such as may have been left unplayed on the record magazine portion of the spindle. In any case the device may be arranged so that the spindle may thus be displaced to a position completely within the cabinet 10, whereupon the records previously mounted upon the spindle will be disposed in the form of a single stack of records resting freely upon the top surface of the cabinet. Thus, these records may be conveniently removed and a new stack of suitably assembled records placed upon the cabinet in lieu thereof. Then, upon upward movement of the spindle 15, the latter will slipfit through the new stack of records until the finger portions 18—19 thereof come into engagement against the bottom record of the stack, whereupon further upward movement of the spindle will result in elevation of the stack of records until such time as the mechanism is again in playing condition. The lever 66 may thereupon be returned to spindle holding position, whereupon the record playing and changing operation referred to hereinabove may proceed.

It will be appreciated that the above described record changing operation may be easily effected because of the fact that the finger and ledge devices 18—19—21—22 are all cam shaped at their extending surfaces so that whenever the spindle 15 is thrust downwardly relative to a stack of records the finger and ledge members are thereby simply cammed into retracted positions so as to permit the spindle to slipfit through the records. However, reverse motion of the spindle relative to a newly placed stack of records is prevented by reason of the abutting action of the upper shoulder portions of the finger members 18—19 against the lower surface of the stack of records.

Thus, it will be appreciated that the present invention provides in connection with a relatively simple record changing mechanism a unique record magazine and holding arrangement at the record playing station inasmuch as the record magazine and played record reservoir portions of the mechanism may be constructed to provide practically unlimited capacity, and inasmuch as the selected record holding mechanism invariably firmly holds and drives the playing record at only one elevation to accommodate elevationally uniform movements of the tone arm while swinging into and out of record playing positions. Also, it will be appreciated that the mechanism of the present invention provides a unique record stack changing operation in that any desired number of records may be simply stacked upon the top surface of the cabinet device whereupon the spindle member may be elevated to slipfit upwardly through the stack of records and then to lift the stack of records into playing position for the mechanism.

It will of course be understood that any suitable device may be employed for controlling the vertical movements of the spindle 15 as described hereinabove; such as either a manually operated arrangement or an automatically operated powered arrangement for lifting the spindle as whenever automatic operation is desired or a relatively heavy load of records are to be carried thereby. Also, it will be appreciated that although only one form of the invention has been illustrated and described herein, it will be apparent to those skilled in the art that the invention is not so limited but that various changes may be made therein without departing from the spirit of the invention or the scope of the appended claims.

We claim:

1. In a multiple record playing device, a rotatable spindle shiftable vertically to adjusted positions, motor means driving said spindle, record dispensing means carried by said spindle at a position thereon providing a record magazine space and corresponding to the position of a stack of records to be slipfitted upon said spindle from the upper end thereof, record holding means carried by said spindle at a position thereon spaced downwardly from the position of said record dispensing means, said record dispensing and holding means being positioned on said spindle in upwardly spaced relation to the lower end of the spindle so as to leave below the holding means a reservoir space for played records, record playing means arranged to swing in and out of record playing positions relative to a record when supported upon said record holding means, means operable to actuate said record dispensing and holding means to release said record holding means and permit a record carried thereby to move into said reservoir space and then to actuate said record dispensing means to release a record from said magazine space to move into engagement upon said record holding means, said spindle and said record dispensing and holding means being arranged for positive movement of said spindle relative to said records.

2. A multiple record playing device comprising a vertically disposed continuous spindle adapted for downward displacement, releasable means normally holding said spindle in operative position, motor means driving said spindle, record dispensing means carried by said spindle at a position thereon providing a record magazine space and corresponding to the bottom position of a stack of records to be slipfitted downwardly upon said spindle, record holding means carried by said spindle at a position thereon spaced below said bottom position of said stack, said record dispensing and holding means being positioned on said spindle so as to leave therebelow a storage space for played records of a capacity substantially equal to that of the record magazine space provided above the position of said record dispensing means, record playing means arranged to swing in and out of record playing positions relative to a record when retained upon said record holding means, and means operable periodically to actuate said record dispensing and holding means so as to first release said record holding means so as to permit a record carried thereby to drop down into said storage space and then to extend again into record receiving position whereupon said record dispensing means is caused to operate so as to release the bottom record only from said magazine space to descend into engagement upon said record holding means, said record dispensing and holding means being cam shaped at their lower extending surfaces and biased to record engaging positions so as to automatically cam out of record retaining positions when engaged by passing records upon release of said spindle and downward displacement thereof relative to stacked records.

3. A multiple record playing device comprising a vertically disposed spindle, motor means driving said spindle, record engagement means carried by said spindle at a position thereon leaving a record magazine space thereabove for supporting a stack of records to be slipfitted downwardly upon said spindle, record holding means carried by said spindle at a position thereon spaced below the position of said record engagement means and providing a record reservoir space therebelow for played records, said holding means comprising groove edge diametrically opposed slide fingers operable to frictionally engage a record at the central bore thereof to hold the record to said spindle for driving thereby independently of said stack of records, record playing means arranged to swing in and out of record engagement positions relative to a record when retained upon said record holding means, and means operable periodically to actuate said record holding and engagement means to first retract said record holding means and permit a record carried thereby to drop down into said reservoir space and then to extend said record holding means into record stopping position and cause said record engagement means to retract and permit a record from said magazine space to descend into engagement upon said record holding means.

4. A multiple record playing device comprising a cabinet, a vertically disposed spindle extending through and above said cabinet, releasable means normally holding said spindle up to extend above said cabinet in operative position, motor means driving said spindle, record engaging means carried by said spindle at a position thereon corresponding to the bottom position of a stack of records to be slipfitted downwardly upon said spindle, record holding means carried by said spindle at a position thereon spaced below the position of said record engaging means, said record engaging and holding means being positioned on said spindle so as to leave therebelow and above said cabinet a storage space for played records of a capacity substantially equal to that of the record magazine space provided above the position of said record engaging means, record playing means arranged to swing in and out of record playing positions relative to a record when retained upon said record holding means, means operable periodically to actuate said record engaging and holding means so as to first release said record holding means so as to permit a record carried thereby to drop down into said storage space and then to extend again into record receiving position whereupon said record engaging means is caused to operate so as to release the bottom record from said stack of records to descend into engagement upon said record holding means, said record engaging and holding means being cam shaped at their lower extending surfaces and yieldably biased to record engaging positions so as to automatically cam out of record retaining positions when engaged by passing records upon release of said spindle and downward displacement thereof relative to stacked records and into said cabinet.

5. In a multiple record playing device, a cabinet having a top wall formed with an opening, a rotatable spindle passing vertically through the opening and shiftable vertically to raised and lowered positions, the upper portion of said spindle being formed with upper and lower vertically spaced sets of openings extending radially of the spindle, supporting fingers for unplayed records slidable in the upper openings urged outwardly through open outer ends thereof to an extended position for supporting a stack of unplayed records, arms for supporting a record in position for playing slidable in the lower openings and urged outwardly to an extended record-supporting position, the lower openings being spaced upwardly from the cabinet when the spindle is in a raised position and thereby providing space under the lower openings for a stack of played records at rest upon the cabinet about the spindle, record playing means movable into and out of position for playing contact with a record resting upon the supporting arms, shafts rotatably mounted vertically in said spindle between the upper and lower sets of openings and having cams at upper and lower ends engaging the fingers and the arms and effecting movement of the fingers and the arms in opposite directions to extended and retracted positions when the shafts are rotated, a drive shaft rotatably mounted in said spindle and geared to the cam-carrying shafts, and means for releasably supporting the spindle in a raised position.

6. The structure of claim 5 wherein outer ends of the fingers and the arms are each provided with a recess constituting seats for a portion of the inner peripheral edge portion of a record and the portions of the outer ends of the fingers and the arms being formed under their recesses with vertically arcuate surfaces extending downwardly at an inward incline and constituting cams serving to shift the fingers and the arms inwardly to a retracted position and thereby permit downward movement of the spindle through the top wall of the cabinet and removal of records from about the spindle.

7. The structure of claim 5 wherein outer ends of the fingers and the arms are formed with recesses constituting seats for receiving portions of inner peripheral edges of records, and thin plates carried by said fingers and projecting outwardly therefrom over their recesses in position for overlapping the lower record of a stack of unplayed records and supporting the remaining ones of the said stack when the fingers are retracted to release the lowest one of the unplayed records and permit the same to move downwardly along the spindle into the recesses in the protruding outer ends of the arms.

KENNETH J. GREGG.
RAYMOND SCHULZE.

References Cited in the file of this patent

UNITED STATES PATENTS

| Number | Name | Date |
|---|---|---|
| 1,568,130 | Blackwell | Jan. 5, 1926 |
| 1,838,101 | Mallina | Dec. 29, 1931 |
| 2,043,789 | Ansley | June 9, 1936 |

FOREIGN PATENTS

| Number | Country | Date |
|---|---|---|
| 822,026 | France | Dec. 18, 1937 |
| 541,156 | Great Britain | Nov. 14, 1941 |